Dec. 9, 1930.  J. V. GIESLER ET AL  1,784,056
THERMOSTATICALLY CONTROLLED VALVE MECHANISM
Filed Oct. 30, 1926  3 Sheets-Sheet 1

Inventors
Jean V. Giesler,
William W. Carson, Jr.,
and Thomas R. Clark,
By
Mauro, Cameron, Lewis & Kerkam
Attorneys

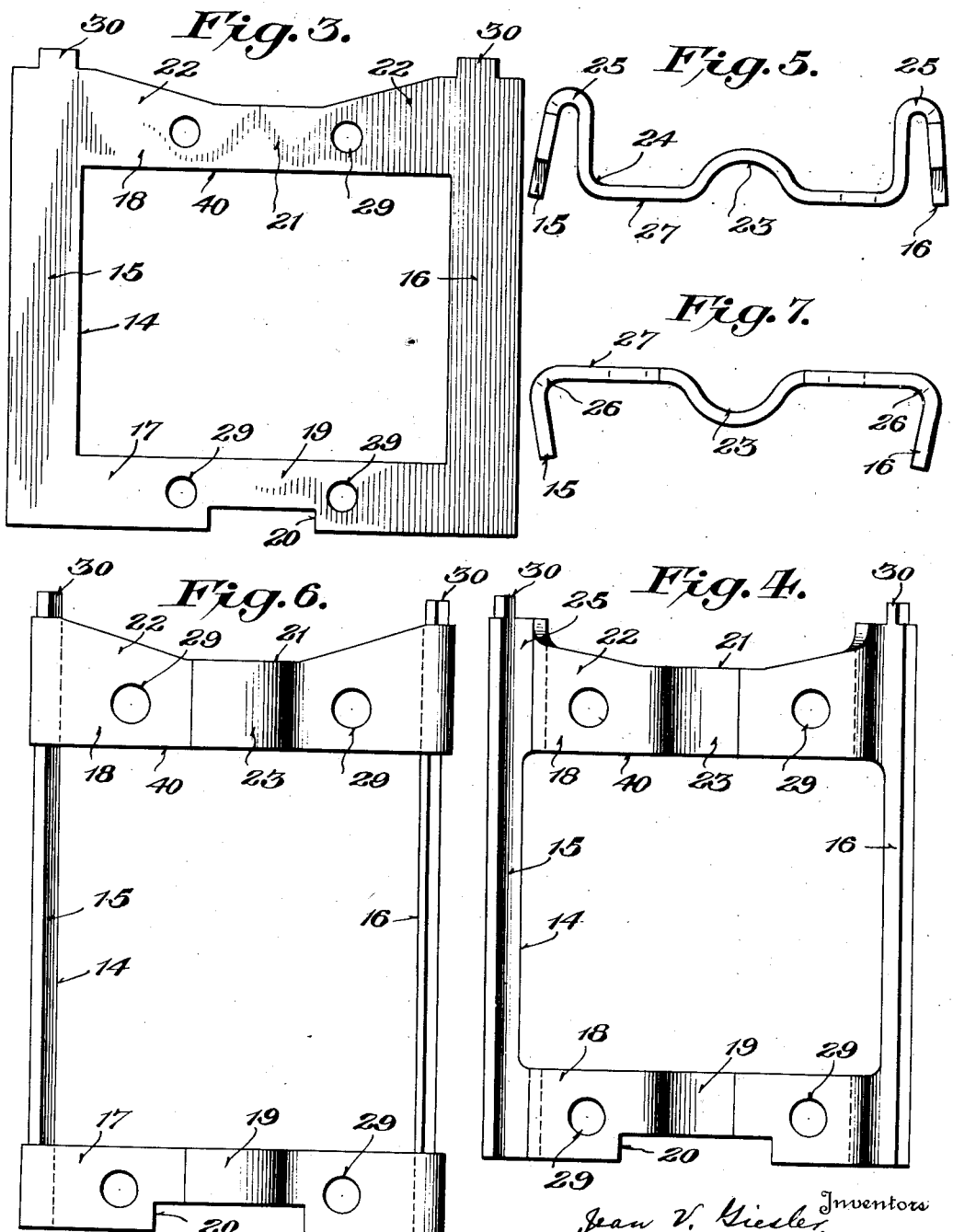

Dec. 9, 1930.  J. V. GIESLER ET AL  1,784,056
THERMOSTATICALLY CONTROLLED VALVE MECHANISM
Filed Oct. 30, 1926   3 Sheets-Sheet 3

Inventors
Jean V. Giesler,
William W. Carson, Jr.
and Thomas R. Clark.
By Mauro, Cameron, Lewis & Kerkam
Attorneys Patented Dec. 9, 1930

1,784,056

UNITED STATES PATENT OFFICE

JEAN V. GIESLER, WILLIAM W. CARSON, JR., AND THOMAS R. CLARK, OF KNOXVILLE, TENNESSEE, ASSIGNORS, BY MESNE ASSIGNMENTS, TO THE FULTON SYLPHON COMPANY, OF KNOXVILLE, TENNESSEE, A CORPORATION OF DELAWARE

THERMOSTATICALLY-CONTROLLED VALVE MECHANISM

Application filed October 30, 1926. Serial No. 145,343.

This invention relates to thermostatically controlled valve mechanism, and particularly to valve mechanism of this character for controlling the circulation of a cooling medium through the cooling system of an internal combustion engine. The invention is capable of embodiment in thermostatically controlled valve mechanism both of the choker type wherein the opening and closing of the valve determines the quantity of circulation through the system and of the by-pass type wherein the opening and closing of the valve determines the path of the circulation.

It is an object of this invention to provide thermostatically controlled valve mechanism of simplified construction so that the cost of material and labor in manufacturing and assembling the parts may be decreased.

Another object of this invention is to provide thermostatically controlled valve mechanism which is light and simple in structure and yet strong and durable and which is efficient and accurate in operation.

Other objects of the invention will appear as the description of the invention proceeds.

The invention is capable of receiving a variety of mechanical expressions some of which are shown on the accompanying drawings, but it is to be expressly understood that the drawings are for purposes of illustration only and are not to be construed as a definition of the limits of the invention, reference being had to the appended claims for that purpose.

Referring in detail to the drawings wherein the same reference characters are employed to designate corresponding parts in the several figures, Fig. 1 is an enlarged axial section of an embodiment of the present invention.

Fig. 3 is a plan view of the blank of which each half of the thermostat may be made.

Fig. 4 is a plan view and Fig. 5 is an end view of one half of the thermostat support illustrating one form into which the blank of Fig. 3 may be bent.

Fig. 6 is a plan view and Fig. 7 is an end view of another form of support and illustrating another form into which the blank of Fig. 3 may be bent.

Figure 1:
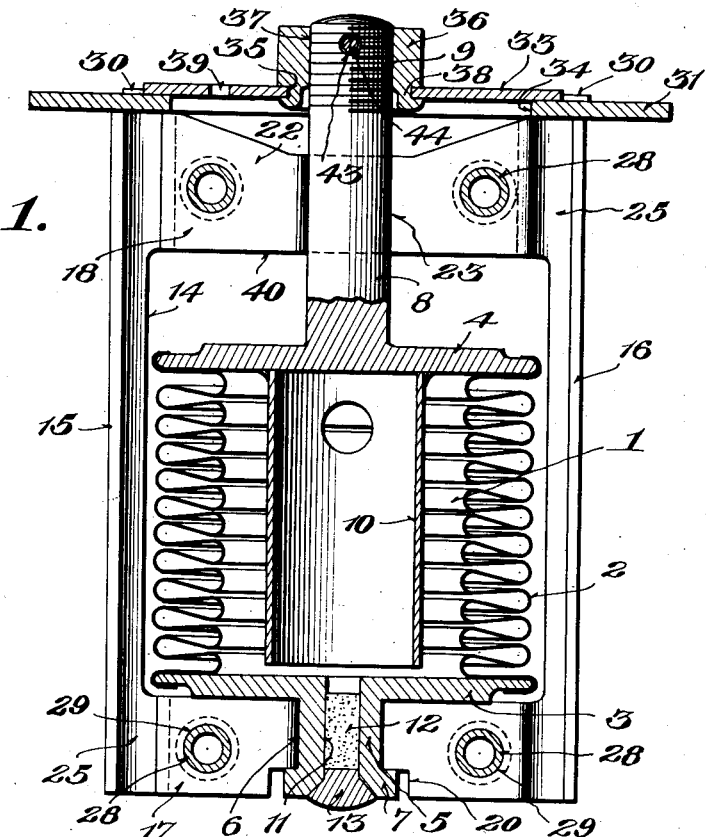

In the form shown in Fig. 1, a thermostat 1 of any suitable construction and physical characteristics and illustrated as employing a deeply corrugated, highly flexible expansible and collapsible tubular metal wall 2, preferably of resilient metal, is provided with an end member 3 designed to be held in stationary position and a movable end member 4. The stationary end member 3 is provided in any suitable way, preferably integral therewith, with a centrally arranged boss 5 which is reduced in diameter intermediate its length as shown at 6 and provided with an enlarged head 7. The movable end wall 4 is provided in any suitable way, as integral therewith, with a valve stem 8 shown as threaded at its exterior end 9. In this embodiment the thermostat is shown as provided with an interior tubular stop 10 integral with or suitably attached to one of the end walls, preferably the movable end wall 4, as by solder. It is to be understood that the thermostat 1 is to be charged with a thermosensitive fluid of any suitable character and a filling opening 11 for this purpose may be provided in the boss 5, said opening being shown as sealed by a stopper 12 and solder 13.

The support for the thermostat is formed of a plurality of sections, which are joined in a plane or planes including the axis of the thermostat to embrace the same, or it may be the axis of a member or members connected therewith if the latter are off center with respect to the axis of the thermostat. The invention will be described by reference to embodiments composed of two sections, or halves, as preferred, but it is to be understood that three or more sections may be used without departing from the broader aspects of the invention. In the form shown the support is composed of halves blanked out of and bent up from sheet metal. A suitable blank for this purpose is illustrated in Fig. 3, having a central, generally rectangular opening 14 which provides a pair of longitudinally extending lateral members 15 and 16 connected by cross pieces 17 and 18, all of which may be of any suitable configuration. Cross piece 17 is preferably reduced in width intermediate its length as shown at 19, as by cutting a notch 20 in the edge of the blank, said portion 19 being of a width equal to the length of that portion of the boss 5 which is of reduced cross section. The cross piece 18 may also be reduced in width intermediate its length as shown at 21, in which event said portion 21 may be connected to the lateral members 15 and 16 by portions of tapering width 22.

A blank of the character shown in Fig. 3 is then bent into any suitable shape to form one of the sections of the thermostat support. The blank may be bent into a variety of conformations, two of which are shown in Figs. 4 to 7. In each of these, the intermediate portions of the cross pieces 17 and 18 are bent into generally semi-circular form as shown at 23 in Figs. 5 and 7 and the lateral members 15 and 16 may be, although not necessarily, bent into a plane making a large angle with respect to the general plane of the cross pieces and form stiffening flanges. In the form shown in Figs. 4 and 5 the cross pieces are each provided with a generally right angular bend 24 intermediate the semi-circular bend 23 and the lateral members 15 or 16, and then reversely bent as shown at 25 adjacent the junction between said cross pieces and said lateral members. Thereby the lateral members 15 and 16 are disposed in a plane making a large angle to the plane of the cross pieces and are preferably disposed at an oblique angle to said cross pieces, as shown, although they may be bent into right angular relation to said cross pieces, if desired. In the form shown in Figs. 6 and 7, the cross pieces are given a single bend 26 adjacent each junction of the cross pieces with the lateral members 15 or 16 so as to dispose said members at a large angle with respect to the general plane of said cross pieces, which angle may be a right angle or an oblique angle as shown.

Figure 2:
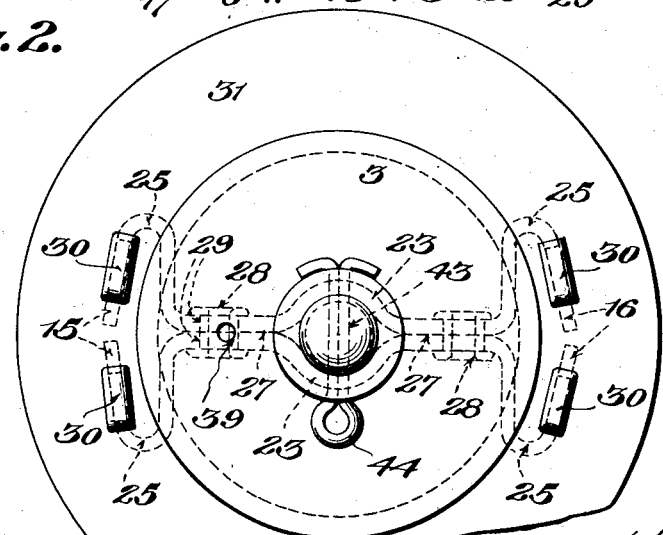
Fig. 2 is a plan view of the valve end of the embodiment of Fig. 1, illustrating the thermostat support in dotted lines.

The thermostat support is completed by assembling a pair of members bent up in the manner heretofore described, as shown in dotted lines in Fig. 2, so that the faces 27 of each half are in contact, and the two halves may be secured together in this position in any suitable way, with the thermostat assembled within the same, as by passing rivets 28 through holes 29 cut in the original blank. A thermostat support of this character is disclosed and claimed in a copending application of Thomas R. Clark, Serial No. 145,342, filed October 30, 1926, and entitled Thermostat supports, to which cross reference is here made.

Figure 9:
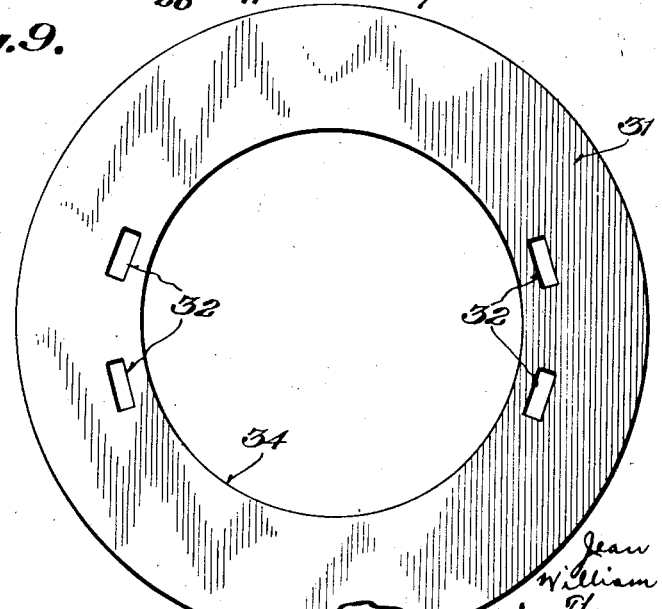
Fig. 9 is a plan view of the valve seat ring which may be used in any of the embodiments.

In conformity with the present invention the sections of the thermostat support, formed in any suitable manner such as heretofore described, are provided with tabs 30 at either or both ends for connection to a valve seat ring or other suitable support. The valve seat ring, shown in Fig. 9, is preferably blanked out of sheet metal and takes the form of an annulus 31 provided with a plurality of generally rectangular apertures 32 so disposed as to receive the tabs 30 when the sections of the thermostat support are assembled with the thermostat. Said tabs 30 may be passed through apertures 32 and then bent over to secure the valve seat ring to the support. If desired, said tabs may also be soldered to the valve seat ring.

A valve of any suitable construction is also provided for mounting on the end of the stem 8. Said valve is also preferably made of sheet metal and is provided at its center with an interiorly threaded hub which may be cut from rod stock and suitably secured to a centrally arranged aperture cut in the valve disk. In the form shown a valve disk 33 of any suitable diameter for coaction with the central aperture 34 in the valve seat ring 31 is cut from sheet metal in the form of an annulus, providing a central aperture 35. A hub 36, formed in any suitable way, and having an interiorly threaded aperture 37 is provided with a thinned skirt portion 38 adapted to fit the aperture 35 and project therethrough so as to permit the skirt portion to be peened or riveted over into engagement with the under face of the disk 33 so as to lock said hub 36 fixedly in position. If desired, the valve disk 33 may be provided with a leakage aperture 39 for a purpose well understood in the art.

Figure 8:
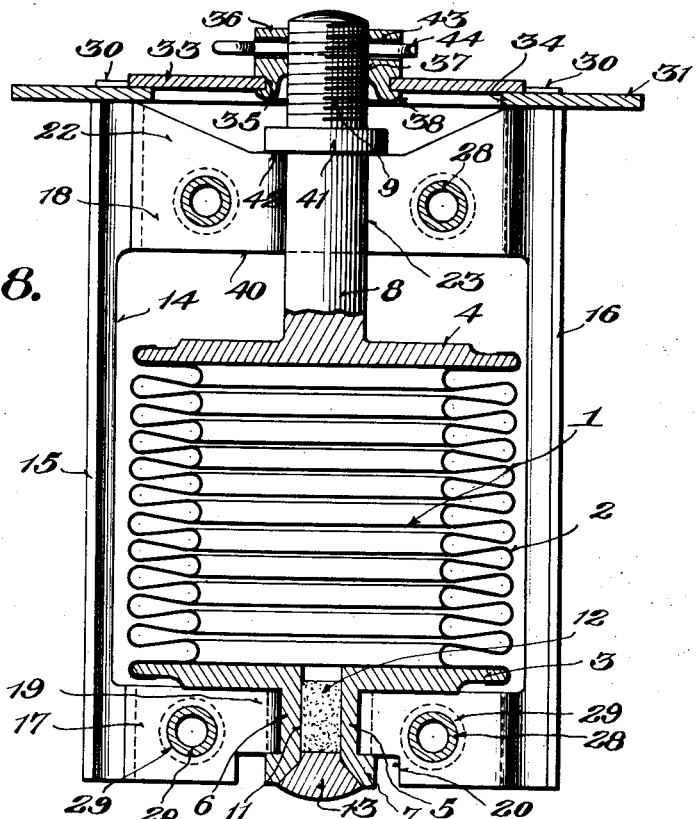
Fig. 8 is an enlarged axial section of another embodiment of the present invention.

In manufacturing a thermostatically controlled valve mechanism embodying the present invention, a thermostat of any suitable character and physical characteristics is formed in any suitable way, the stationary end member 3 being provided with a boss 5 of the character heretofore described and the movable end member 4 being provided with a valve stem as heretofore described. The two halves of the thermostat support having been formed in the manner heretofore explained, the two halves of the support are assembled about the thermostat with their faces 27 in contact and the two halves are then secured together as by riveting. In so assembling the parts the two generally semi-circular portions 23 in the cross pieces 17 embrace the portion 6 of the boss 5 that is of reduced diameter, and as the portion 19 is of the same width as the length of said portion of reduced diameter, said semi-circular portions fit snugly around and within the groove provided between the stationary end member 3 and the enlarged head 7 so that the stationary end member 3 is fixedly locked in position. The generally semi-circular portions 23 formed in the cross pieces 18 embrace the stem 8 and constitute a guide therefor. When desired, said cross pieces 18 may also constitute a stop to limit the expansive movement of the thermostat by making the length of the aperture 14 originally formed in the blank equal in length to the over all length of the thermostat when in its fully expanded position, whereby the inner edge 40 of the cross pieces 18 will engage the outer face of the movable end wall 4 and positively limit the expansive movement of the thermostat. In the form shown in Fig. 1 the collapsing movement of the thermostat, when the valve is not in position, is limited by the engagement of the tubular interior stop 10 with the end wall of the thermostat, but if desired, the interior stop 10 may be omitted, as shown in Fig. 8, and a collar 41 may be formed on or suitably attached to the valve stem 8 so that it will engage the outer edge 42 of the cross pieces 18 and thereby constitute a positive stop for the collapsing movement of the thermostat. When the latter construction is employed the cross pieces 18 are made to embrace the stem 8 inside of the collar 41 in assembling the parts as heretofore described.

The thermostat and support may then be assembled with the valve seat ring 31 by passing the tabs through the apertures 32 and then bending the same over into contact therewith, also soldering the same, if desired. A valve disk, constructed in the manner heretofore described, may then be threaded on to the threaded end 9 of the valve stem 8 until it engages the valve seat ring and lifts the stop, 10 or 41, slightly off of its opposed surface 3 or 42, in which position the valve disk may be securely locked to the valve stem in any suitable way, as by drilling a hole 43 through the hub 36 and stem 8 and securing a cotter pin 44 within said hole.

As heretofore pointed out, the thermostat may be of any suitable construction and possessed of any suitable characteristics, but it is preferably charged with a thermosensitive fluid at a pressure below atmospheric, at normal or atmospheric temperature, so that atmospheric pressure tends to collapse the bellows at normal temperature. Thereby upon the occurrence of a leak and equalization of interior and exterior pressures, the thermostat tends to expand to move the valve disk away from its seat. The valve disk may also be made of any suitable area with respect to the effective area of the corrugated wall so that the pressures within the circulating system may produce an unbalanced pressure on the thermostatic valve mechanism tending to move the valve to safety position upon the occurrence of a leak, and this may be utilized in conjunction with or in substitution for the charging of the thermostat at a subnormal pressure.

It will therefore be perceived that a thermostatic valve mechanism has been provided which is largely composed of sheet metal elements that may be readily stamped, formed and assembled, so that the parts are inexpensive to manufacture and assemble. At the same time, the thermostatic valve mechanism is light and simple and also strong and durable in its construction. Owing to the interaction of the halves of the frame or support for the thermostat with the hub on the stationary end member of the thermostat, the latter is fixedly locked against displacement. At the same time the halves of the frame or support for the thermostat afford a positive guide for the valve stem and may also positively limit either or both of the expansive and contractive movements of the thermostat. The valve seat ring is simply and inexpensively manufactured and may be readily assembled with the thermostat support, and at the same time is rigidly united therewith. The valve is also simply and inexpensively manufactured from standard stock. The thermostatic valve unit is strong and rigid because the disposition of the lateral members 15 and 16 as stiffening flanges running at an angle to and longitudinally of the halves of the frame gives great rigidity to the structure, especially when interlocked with the valve seat ring in the manner heretofore described. The entire unit may therefore be manufactured with a great saving in labor and material over structures employing drawn, forged and cast parts as heretofore used.

While the embodiments of the invention illustrated on the drawings have been described with considerable particularity it is to be expressly understood that the invention is not restricted thereto as the same is capable of receiving a variety of mechanical expressions, some of which will now readily suggest themselves to those skilled in the art, while changes may be made in the details of construction, arrangement and proportion of parts without departing from the spirit of the present invention. While it is preferred to bend the blanks so as to dispose the lateral members 15 and 16 at an angle to the plane of the cross pieces 17 and 18, as this gives a more compact structure, the lateral members may be left in the same plane as the cross pieces, within the broader aspects of the invention, where space will admit of such construction, and said lateral members will still subserve their function of stiffening flanges to give rigidity to the support. It is also to be expressly understood that while it is preferred to compose the support of two sections or halves as heretofore described, the support may be made up of a larger number of sections suitably shaped or bent so as to embrace the axis of the thermostat or elements thereon. Where reference is made in the claims to the axis of the thermostat being embraced by the sections of the support, it is to be understood that this expression includes constructions wherein the sections embrace the axis of a member or members on the end walls of the thermostat if they are off center with respect to the axis of the thermostat, and whether the support is composed of two or more sections. Reference is therefore to be had to the appended claims for a definition of the limits of the invention.

What is claimed is:

1. In a thermostatically-operated valve mechanism of the character described, a valve member composed of a sheet metal disk provided with an interiorly threaded hub secured to said disk.

2. In a thermostatically-operated valve mechanism of the character described, a valve member including an annulus of sheet metal and an interiorly threaded hub provided with a skirt and secured in the central aperture of said annulus by means of said skirt.

3. In a device of the character described, in combination with a thermostat, a support therefor provided with tabs, a valve seat ring provided with apertures in which said tabs are retained, and a valve disk adapted to cooperate with said seat and operatively connected to said thermostat.

4. In a device of the character described, in combination with a thermostat, a support therefor, a valve seat ring formed of sheet metal and provided with apertures, means for securing said valve seat ring to said support including tabs on said support adapted to be secured in the apertures of said ring, and a valve disk cooperating with said seat and operatively connected to said thermostat.

5. In a device of the character described, in combination with a thermostat including stationary and movable end members, a valve member operatively connected to said movable end member, a boss having a reduced portion on said stationary end member, an annular member, and a support for said thermostat extending from said annular member and provided with a transverse portion adapted to interlock with the reduced portion of said boss and thereby fixedly retain the stationary end member of said thermostat in position.

6. In a device of the character described, in combination with a thermostat including movable and stationary end members, a valve member operatively connected to said movable end member, a boss having a reduced portion on said stationary end member, an annular member, and a sectional frame for said thermostat extending from said annular member and including a sectional transverse portion adapted to interlock with the reduced portion of said boss and retain said stationary end member in fixed position.

7. In a device of the character described, in combination with a thermostat and a valve stem operatively connected thereto, a support for said thermostat composed of sections adapted to be united to embrace the axis of said thermostat, and means on said stem cooperating with said frame sections to limit the contractive movements of said thermostat.

8. In a device of the character described, in combination with a thermostat and a valve stem operatively connected thereto, a support for said thermostat composed of sections adapted to be united to embrace the axis of said thermostat, and means moving with said stem and cooperating with said frame sections to limit both the expansive and the contractive movements of said thermostat.

9. In a device of the character described, in combination with a thermostat, a valve member, a stem operatively connecting said valve member and thermostat, a boss on said thermostat, an annular member, and a support for said thermostat extending from said annular member and including frame members having transverse portions curved to interlock with said boss and to provide a guide for said stem.

10. In a device of the character described, in combination with a thermostat, a valve member, a stem operatively connecting said valve member and thermostat, a boss on said thermostat, an annular member, and a support for said thermostat extending from said annular member and including frame members having transverse portions curved to interlock with said boss and to provide a stop for said thermostat.

11. In a device of the character described, in combination with a thermostat, a valve member operatively connected thereto, a valve seat member for cooperation with said valve member, and a support for said thermostat including frame sections providing lateral members which are bent along their length so as to form stiffening flanges which extend lengthwise thereof, said support being connected to said valve seat member.

12. In a device of the character described, in combination with a thermostat, a valve member operatively connected thereto, a valve seat member for cooperation with said valve member, and a support for said thermostat including frame sections having lateral members constituting stiffening members and provided with tabs which interlock with said valve seat member.

13. In a device of the character described, in combination with a thermostat, a valve member operatively connected thereto, a valve seat member for cooperation with said valve member, and a support for said thermostat including frame sections formed of sheet metal and provided with lateral members disposed to afford stiffening flanges and interlocked with said valve seat member and cross members confining the thermostat and connecting said lateral members.

14. In combination with a thermostat having a stationary end member, a boss on said end member having a head and a reduced intermediate portion, an annular member, and a support for said thermostat extending from said annular member and provided with sectional transverse portions one of which is adapted to embrace said boss between said stationary end member and said head for fixedly securing said thermostat in position and the other of which is adapted to guide the movements of said thermostat.

15. In combination with a thermostat having a stationary end member, a boss on said stationary end member provided with a head and a reduced intermediate portion, an annular member, and a support for said thermostat extending from said annular member and including frame sections having cross pieces of the width of the reduced portion of said boss and transversely curved so as to snugly embrace said boss at said reduced region.

16. In combination with a thermostat provided with stationary and movable end walls, a stem on said movable end wall, a boss on said stationary end wall, an annular member, and a support for said thermostat extending from said annular member and composed of sections including cross pieces curved to embrace said boss and said stem and side members connecting said cross pieces and constituting stiffening members.

17. In a device of the character described, in combination with a thermostat, a valve member operatively connected thereto, a valve seat member for cooperation with said valve member, and a support for said thermostat interlocked with said valve seat member, said support including frame sections united to embrace the axis of said thermostat.

18. In a device of the character described, in combination with a thermostat, a valve member operatively connected thereto, a valve seat member for cooperation with said valve member, and a support for said thermostat interlocked with said valve seat member, said support being formed of frame sections including cross pieces between which said thermostat is mounted.

19. In a device of the character described, in combination with a thermostat, a valve member operatively connected thereto, a valve seat member for cooperation with said valve member, and a support for said thermostat interlocked with said valve seat member, said support being formed of frame sections including longitudinally extending lateral members which constitute stiffening flanges disposed on either side of said thermostat.

20. In a device of the character described, in combination with a thermostat, a valve member operatively connected thereto, a valve seat member for cooperation with said valve member, and a support for said thermostat interlocked with said valve seat member, said support being formed of sheet metal frame sections including cross pieces bent to afford a guide for the valve stem.

21. In a device of the character described, in combination with a thermostat, a valve member operatively connected thereto, a valve seat member for cooperation with said valve member, and a support for said thermostat interlocked with said valve seat member, said support being formed of sheet metal frame sections including cross pieces bent to form a member for rigidly mounting said thermostat in position.

22. In a device of the character described, in combination with a thermostat, a valve member operatively connected thereto, a valve seat member for cooperation with said valve member, and a support for said thermostat interlocked with said valve seat member, said support being formed of sheet metal frame sections including cross pieces bent to provide a stop for the thermostat.

23. In a device of the character described, in combination with a thermostat, a valve member operatively connected thereto, a valve seat member for cooperation with said valve member, and a support for said thermostat interlocked with said valve seat member, said support being formed of sheet metal frame sections including longitudinally extending lateral members and cross pieces connecting the same and bent to dispose said lateral members at an angle to said cross pieces.

In testimony whereof we have signed this specification.

JEAN V. GIESLER.
WILLIAM W. CARSON, Jr.
THOMAS R. CLARK.